United States Patent [19]
Benson

[11] 3,869,521
[45] Mar. 4, 1975

[54] AROMATIC HYDROGENATION USING SODIUM BOROHYDRIDE REDUCED TRANSITION METAL SUPPORTED CATALYSTS

[75] Inventor: Robert F. Benson, Fayetteville, Ark.

[73] Assignee: Texaco, Inc., New York, N.Y.

[22] Filed: Dec. 29, 1972

[21] Appl. No.: 319,574

Related U.S. Application Data

[63] Continuation of Ser. No. 158,581, June 30, 1971, abandoned.

[52] U.S. Cl............... 260/667, 260/683.9, 252/432
[51] Int. Cl................................................ C07c 5/10
[58] Field of Search .......... 252/432; 260/667, 683.9

[56] References Cited
UNITED STATES PATENTS
3,210,157 10/1965 Lewis.................................. 23/211
3,322,686 5/1967 Brown et al. ....................... 252/432
3,328,119 6/1967 Robson................................. 23/113
3,522,192 7/1970 Maxwell.............................. 252/432

*Primary Examiner*—Veronica O'Keefe
*Attorney, Agent, or Firm*—T. H. Whaley; C. G. Ries

[57] ABSTRACT

Supported transition metal catalysts are provided by a method comprising impregnating a catalyst support with a solution comprising a catalyst metal ion; at least partially drying the saturated catalyst support; admixing the dried catalyst support with sodium borohydride until the evolution of gas ceases, thereby obtaining an active supported metal catalyst; and thereafter, recovering the active catalyst.

10 Claims, No Drawings

AROMATIC HYDROGENATION USING SODIUM BOROHYDRIDE REDUCED TRANSITION METAL SUPPORTED CATALYSTS

This is a continuation of application Ser. No. 158,581, filed June 30, 1971 now abandoned.

This invention relates to supported catalysts and methods for the preparation thereof. More specifically, this invention relates to supported transition metal hydrogenation catalysts and to methods for the preparation thereof.

A wide variety of hydrogenation reactions such as hydrogenation, hydrocracking, reforming, hydrofinishing, dealkylation and the like, rely upon transition metal catalysts for economical commercial operation. Generally, these catalysts are prepared by impregnating a suitable support with a transition metal salt and reducing the salt to the metal via conventional high-temperature reduction with hydrogen. It has been found that high-temperature reduction can damage the pore structure of many support materials. Thus, conventional reduction techniques impose an undue limitation upon the selection of catalyst supports. Moreover, supported catalysts which have heretofore been prepared generally comprise an intimate mixture of the catalyst and support. This intimate mixture, usually obtained by complete impregnation of the support, effectively blocks the pore structure of the support thereby essentially precluding subsequent deposition of one or more catalysts on the support. Most importantly, however, it has been found that hydrogen reduction results in inconsistent and often unpredictable catalyst activity which is often dependent upon the thermal history of the reduction sequence.

Accordingly, it is an object of the present invention to provide a process for the preparation of supported catalysts which overcomes the above-noted deficiencies.

It is another object of the present invention to provide a process for reducing supported metal compounds to active metal catalysts at relatively low temperatures, e.g., room temperature, thereby avoiding damage to the pore structure of the support and enabling a wide variety of supports to be employed.

It is another object of the present invention to provide a process whereby all of the metal catalyst is present at the support surface, rather than in intimate admixture with the support. In this manner, less catalyst metal is required to achieve full coverage of a given support surface.

It is still another object to provide a reduction technique which consistently and predictably imparts a high level of catalyst activity to the supported catalyst.

It is a still further object of the present invention to provide a process which enables the impregnation of one or more catalysts into a support at different times.

These as well as other objects are accomplished by the present invention which provides a method for forming an active supported metal catalyst comprising impregnating a catalyst support with a solution comprising a catalyst metal ion, at least partially drying the saturated catalyst support; admixing the dried catalyst support with sodium borohydride until cessation of the evolution of gas, thereby obtaining an active supported metal catalyst; and thereafter, recovering the active catalyst.

The metallic supported catalysts of the present invention can be formed from transition metal compounds wherein the transition metal is selected from Periods IV through VI of the Periodic Table of the Elements (see, Handbook of Chemistry and Physics, 39th Edition, Chemical Rubber Publishing Co., Cleveland, Ohio (1957), pp. 395–399). Illustrative of such transition metals are titanium, vanadium, chromium, manganese, iron, cobalt, nickel, copper, zirconium, niobium, molybdenum, ruthenium, rhodium, palladium, silver, cadmium, hafnium, tantalum, tungsten, rhenium, osmium, iridium, platinum and the like. Any compound of those metals when impregnated into a catalyst support can be suitably reduced in accordance with the present invention. For example, the halides such as the chlorides, bromides, iodides and fluorides can be conveniently employed. Also, the oxides, nitrates and the like can be suitably employed. Upon reduction, these metallic compounds are reduced to the metal, a lower oxide or an interstitial metal boride depending upon the particular metal.

A wide variety of catalyst supports can be employed in the present invention. Suitable carrier materials are, for example, granular aluminas such as gamma alumina, zirconias, silicon carbide, crystalline aluminosilicates, hydrogen aluminosilicates such as hydrogen mordenite and the like. Preferably, the catalyst supports exhibit surface areas ranging from about 150 to about 600 m$^2$/gm and pore volumes ranging from about 0.10 to about 0.60 cc./gms. Most preferably, supports are employed which exhibit pore volume ranging from about 0.30 to about 0.40 cc./gm. The supports can be in any particulate form such as tableted, extruded or the like.

A preferred catalyst support is hydrogen mordenite, a crystalline aluminosilicate which, in the hydrogen form, exhibits catalytic properties. Although mordenite occurs in nature, synthetic mordenites are commercially available from the Norton Company under the tradename Zeolon. These mordenites have a chemical composition, on a unit cell basis, of

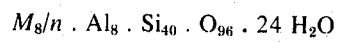

$$M_{8/n} \cdot Al_8 \cdot Si_{40} \cdot O_{96} \cdot 24\ H_2O$$

where $M$ may be sodium, hydrogen or some other exchangeable cation, and $n$ is the valence of the cation. The high ratio of silica to alumina of 10:1 in the synthetic mordenite permits complete acid exchange to a stable hydrogen form and imparts excellent chemical and thermal stability. The effective working diameter of hydrogen mordenite prepared by acid treating synthetic sodium mordenite and marketed under the tradename Zeolon H appears to be in the range of 8 to 10 A as indicated by an adsorption of aromatic hydrocarbons.

Structurally mordenite is significantly distinguishable from other zeolites. Mordenite has a chain type zeolite structure in which a number of chains are linked together into a structural pattern with parallel sorption channels similar to a bundle of parallel tubes. In contrast Type A, Type X and Type Y synthetic zeolites and faujasite have three dimensional crystalline cage structures having 4 to 6 windows or pore openings per unit cell through which access may be had to the inner cavity or unit cell of the zeolitic molecular sieve.

Active catalysts can be prepared quite conveniently by the present invention under substantially room temperature reduction conditions. For example, particulate catalyst supports, whether tabletted, extruded or the like can be admixed or simply immersed in a solution containing the dissolved metal compound. After sufficient time to enable the support to become impregnated with the solution, generally from about 0.1 to about 5.0 hours, the support is removed from the solution and allowed to undergo at least partial drying such as by drip drying or solvent removal as by evaporation, depending upon the nature of the solvent employed, thereby leaving a residue of the metallic compound within the pores of the support material. The impregnated support is then admixed with an aqueous solution of sodium borohydride. Preferably a dilute solution of from about 0.05 to about 0.50 molarity containing an excess of the stoichiometric quantity of sodium borohydride in water is employed. Sodium borohydride reduction proceeds efficiently and effectively at room temperature. Thus, although higher or even lower temperatures can be employed during reduction, it is considered preferable to employ room temperatures, i.e., generally about 25°C. Most conveniently, the sodium borohydride solution is continually poured over the impregnated support until cessation of the evolution of hydrogen. As the reduction reaction nears completion, the particulate supports generally take on a gray to black appearance indicating the deposition of the reduced form of the metal. Once the effervescence of hydrogen generation is not significantly renewed upon addition of fresh borohydride solution, reduction can be considered complete.

The catalyst supports containing the reduced metal catalyst in the surface layers thereof can then be water washed to remove any unreacted metal salts or residual borohydride solution and then dried at temperatures of from about 50 to about 150°C. resulting in an active hydrogenation catalyst.

Although not wishing to be bound by any theory or mechanism, it is currently believed that the reduced metal catalyst remains essentially at the surface of the support because of the powerful reducing ability of the borohydride solution and the low temperatures employed for reduction. The diffusion of metal away from the support surface to areas of relative inaccessibility is a function of the square root of the temperature (see, *Chemical Engineering Kinetics*, J. M. Smith, McGraw-Hill, 1956, page 268); hence, the catalyst reduction with borohydride solution at low temperatures results in lower catalyst diffusion into the support and thus higher "surface" metal content.

The supported catalysts of the present invention can be employed in hydrogenation reactions whether as fixed beds, packed columns or in a fluidized condition. It is apparent, of course, that hydrogenation conditions will vary for optimum results depending upon the particular metal catalyst employed.

The following examples further define, describe and compare methods of preparing the supported metal catalysts of the present invention and of utilizing them in hydrogenation reactions. Parts and percentages are by weight unless otherwise indicated.

EXAMPLE 1

Gamma-alumina, in pelletized form, having a surface area of 220 m²/gm and a pore volume of 0.40 cc./gm. was immersed in a 1.0 molar solution of nickelous nitrate for 3 hours at room temperature. The saturated pellets were then removed from the solution and allowed to drip dry, thereby effecting partial drying of the supports. Next, the pellets were immersed in an alkaline aqueous solution of 0.1 molar sodium borohydride at room temperature and allowed to react until the evolution of gas terminated. Further addition of sodium borohydride gave no further evolution of gas. The supported nickel catalyst was removed from the solution, washed with water and dried at 120°C. for 4 hours.

X-ray analysis indicated the presence of 3.3 percent of nickel on the support surface. The initially white alumina pellets were black in color indicating reduction of the nickelous nitrate to the metal.

Methylnaphthalene was charged to a reactor containing a fixed bed of catalyst prepared in the manner described above. The reaction vessel was maintained at 600°F. and under a hydrogen pressure of 1500 psig. Analysis by gas chromatography and infra-red spectrometry indicated a conversion of about 30% methylnaphthalene to naphthalene and methane.

Surprisingly, a nickel catalyst prepared in essentially the same manner as described above but reduced with hydrogen at 825°F. for 16 hours, required a temperature of about 1,200°F. in order to demethylate methylnaphthalene.

EXAMPLE 2

Gamma-alumina pellets as described in Example 1 were immersed in a 0.02 molar solution of chloroplatinic acid for 3 hours. The saturated pellets were then removed from the solution and partially dried by allowing the pellets to drip dry. The partially dried pellets were immersed in a 0.1 molar solution of sodium borohydride until cessation of all evolution of hydrogen gas. Further addition of sodium borohydride resulted in no gas evolution. The supported platinum catalysts thus obtained was removed from the solution, washed with water and dried.

Benzene was charged to a reactor containing a fixed bed of the platinum catalyst prepared as described above. The reactor was maintained at a temperature of 250°C. and a hydrogen pressure of 400 psig. Benzene was coverted to cyclohexane in 79% conversion at a space velocity of 0.88 w/hr./w. At a space velocity of 2.0 w/hr./w., all other conditions being essentially the same as above, benzene was converted to cyclohexane in 62% conversion.

EXAMPLES 3–6

A variety of hydrogenation catalysts were prepared in the manner described in Example 1 using gamma alumina and Zeolon-H as supports. The supports exhibited pore volumes of 0.40 and 0.30 cc./gm., respectively. Zeolon-H comprises mordenite, a hydrogen aluminosilicate, manufactured by the Norton Company. These catalysts were evaluated as hydrogenation catalysts and the results obtained are summarized in Table I below.

Table I

| Example | 3 | 4 | 5 | 6 |
|---|---|---|---|---|
| Catalyst Composition | Pt/Al$_2$O$_3$ 1.1% Pt | Re/Zeolon-H 3% Re | Re/Zeolon-H 3% Re | Pd/Zeolon-H 1.3% Pd |
| Surface Area | 220 m$^2$/gm | 350 m$^2$/gm | 350 m$^2$/gm | 350 m$^2$/gm |
| Hydrogenation Conditions | | | | |
| Temp. (°F.) | 482 | 482 | 482 | 482 |
| Pressure (psig) | 400 | 400 | 400 | 400 |
| WHSV | 0.88 | 1.78 | 1.0   2.0 | 1.0   2.0 |
| H$_2$/Hydrocarbon (molar ratio) | 20:1 | 10:1 | 24:1  12:1 | 24:1  12:1 |
| Hydrocarbon | benzene | benzene | toluene | toluene |
| Yield (%) | 79[1] | 35[1] | 83[2] 60[2] | 77[2] 80[2] |

[1]yield of cyclohexane
[2]yield of methylcyclohexane

EXAMPLES 7–8

In the following examples and comparative examples, sodium borohydride reduction of supported catalysts in accordance with the present invention is compared with catalysts reduced in the conventional manner under a flow of hydrogen at elevated temperatures.

For purposes of comparison, catalyst metal compounds were impregnated into a Zeolon-H support in the manner described in Example 1 to provide common sources of samples for reduction by various techniques. The palladium compound represents an easily reduced metal, whereas, the rhenium compound respresents a difficultly reduced metal. The compounds impregnated into the catalyst supports were reduced by sodium borohydride reduction, reduction with hydrogen at an elevated fixed temperature or reduction with hydrogen at sequentially increasing temperatures. The results obtained are summarized in Table II below.

From these comparisons, it can be seen that reduction with sodium borohydride in accordance with the present invention reduced the catalysts and imparted consistent activity thereto; whereas, the activities of the catalysts reduced by hydrogen were found to be a function of the thermal history. For example it can be seen that palladium reduced by sodium borohydride exhibited a high level of hydrogenation activity, while palladium reduced in hydrogen was inactive in one instance and more active than that reduced by the borohydride reaction in another instance. The more difficult reduction of the rhenium catalysts followed a somewhat similar trend in that the sodium borohydride treated catalyst was very active while the catalysts treated with hydrogen exhibited only token activity. In the case of the rhenium catalyst comparisons, the sodium borohydride reduced catalyst exhibited far superior activity than the catalysts reduced in hydrogen.

TABLE II

Comparison of Catalyst Reduction Techniques and Hydrogenation Activity of Resulting Catalysts in Conversion of Toluene to Methylcyclohexane

| Precursor Batch | PdCl$_2$/Zeolon-H | | | NH$_4$ReO$_4$/Zeolon-H | | Re$_2$O$_7$/Zeolon-H |
|---|---|---|---|---|---|---|
| Catalyst | Pd/Zeolon H | Pd/Zeolon H | Pd/Zeolon H | ReO$_2$/Zeolon H | ReO$_2$/Zeolon H | ReO$_2$/Zeolon H |
| Reduction Method | NaBH$_4$ in Alcohol | H$_2$-temp. programmed[1] | H$_2$-Static heat[2] | NaBH$_4$ in Alcohol | H$_2$-temp. programmed[3] | Calcined-H$_2$ temp. programmed[4] |
| Hydrogenation Conditions | | | | | | |
| Temperature(°F) | 482 | 482 | 482 | 482 | 482 | 482 |
| Pressure (psig) | 400 | 400 | 400 | 400 | 400 | 400 |
| WHSV | 2.0    1.0 | 2.0 | 2.0 | 2.0    1.0 | 1.0 | 2.0    1.0 |
| Mole Ratio H$_2$/Toluene | 12:1   24:1 | 12:1 | 12:1 | 12:1   24:1 | 12:1 | 12:1   24:1 |
| Yield Methylcyclohexane (%) | 80    77 | 100 | 0 | 60    83 | 3 | 0    0 |

[1]Reduced at 1800 psig., 0.1 ft.$^3$/min H$_2$ flow and raised in 100°F. increments each hour from 200°F. to 700°F
[2]Reduced in a rocking bomb for about 16 hours at 825°F. under hydrogen.
[3]Reduced at 400 psig., 0.1 ft.$^3$/min H$_2$ flow and raised 81°F. every hour until reaching 662°F. After one hour, reaction temperature was raised to 800°F. and held over 48 hours.
[4]Calcined at 1112°F. for 4 hours. Reduced in hydrogen at 150°F. and increased 180°F. every hour to a final temperature of 842°F. and held at that temperature for 16 hours.

Although specific materials and conditions were set forth in the above exemplary processes in making and using the supported catalysts of this invention, these are merely intended as illustrations of the present invention. Various other transition metal salts, catalyst supports and reaction parameters such as those listed above may be substituted in the examples with similar results.

Other modifications of the present invention will occur to those skilled in the art upon a reading of the present disclosure. These are intended to be included within the scope of this invention.

What is claimed is:

1. In a catalytic hydrogenation process of organic compounds selected from the group consisting of benzene, mono-alkylbenzene and mono-alkylnaphthalene to yield, in the case of benzene and mono-alkylbenzene, the corresponding cyclohexane and, in the case of mono-alkylnaphthalene, naphthalene and the corresponding alkane wherein the catalyst comprises a supported transition metal selected from, the group consisting of nickel, platinum, palladium and rhenium the improvement which comprises utilizing as the supported catalyst one prepared by impregnating a catalyst support with a solution of a transition metal salt, at least partially drying said support, contacting said support with a sodium borohydride solution until cessation of the evolution of gas and thereafter recovering the active transition metal supported catalyst.

2. A process according to claim 1 wherein the transition metal is platinum.

3. A process according to claim 1 wherein the transition metal is nickel.

4. A process according to claim 1 wherein the transition metal is rhenium.

5. A process according to claim 1 wherein the transition metal is palladium.

6. A process according to claim 1 wherein the catalyst support is gamma alumina.

7. A process according to claim 1 wherein the catalyst support is a crystalline aluminosilicate zeolite.

8. A process according to claim 1 wherein the catalyst support is impregnated with transition metal ion by admixing said support with a solution containing the metal ion for a period of from 0.1 to about 5.0 hours.

9. A process according to claim 1 wherein the dried catalyst support is admixed with a dilute aqueous solution of from about 0.05 to about 0.5 molarity of sodium borohydride, said amount representing an excess of the stoichiometric quantity of sodium borohydride required for reduction.

10. A process according to claim 1 wherein the reduction of the impregnated catalyst support is conducted at about room temperature.

* * * * *